US006467978B1

(12) United States Patent
Tideman, Jr.

(10) Patent No.: US 6,467,978 B1
(45) Date of Patent: Oct. 22, 2002

(54) LARGE SURFACE IMAGE REPRODUCTION SYSTEM

(76) Inventor: John D. Tideman, Jr., 20726 W. Richmond Rd., Bothell, WA (US) 98021

( * ) Notice: Subject to any disclaimer, the term of this patent is extended or adjusted under 35 U.S.C. 154(b) by 0 days.

(21) Appl. No.: 09/252,839

(22) Filed: Feb. 19, 1999

Related U.S. Application Data

(60) Provisional application No. 60/077,813, filed on Feb. 27, 1998.

(51) Int. Cl.$^7$ ................................................ B41J 11/44
(52) U.S. Cl. ............................ 400/76; 400/61; 400/70; 101/483
(58) Field of Search ............................ 400/76, 70, 61, 400/88, 279; 101/483, 492

(56) References Cited

U.S. PATENT DOCUMENTS

| | | | |
|---|---|---|---|
| 3,847,112 A | 11/1974 | Wise | 118/7 |
| 4,077,356 A | 3/1978 | Andrews | 118/301 |
| 4,611,695 A | 9/1986 | Kato et al. | 118/323 |
| 4,683,836 A | 8/1987 | West | 118/305 |
| 4,944,243 A | 7/1990 | Takeno et al. | 118/305 |
| 5,662,968 A | 9/1997 | Yamaguchi | 427/421 |
| 5,972,111 A | * 10/1999 | Anderson | 118/300 |
| 6,089,160 A | * 7/2000 | Anderson | 101/483 |
| 6,090,445 A | * 7/2000 | Anderson | 101/492 |
| 6,319,555 B1 | * 11/2001 | Anderson | 101/492 |

* cited by examiner

Primary Examiner—Andrew H. Hirshfeld
Assistant Examiner—Charles H. Nolan, Jr.
(74) Attorney, Agent, or Firm—Dean A. Craine

(57) ABSTRACT

A system for automatically reproducing an image on a large surface, such as the external wall of a building or a billboard. The system includes a computer, a translator program, a controller card and image reproduction machinery. The computer is programmed with the translating program which converts a downloaded image file into a data file capable of being used by the controller card. The controller card is used to control drivers which control various motors on the image reproduction machinery. The image production machinery comprises a guide rail, a carriage, and a medium head assembly. The guide rail is suspended adjacent to the surface to be painted. During operation, the guide rail moves along one axis of the surface and the carriage moves longitudinally over the guide rail. The medium head assembly contains a plurality of airbrushes which are equally spaced apart with their tips aimed at a single point on the wall thereby producing a single pixel of various colors and shades.

12 Claims, 6 Drawing Sheets

US 6,467,978 B1

LARGE SURFACE IMAGE REPRODUCTION SYSTEM

This is a utility patent application based on a provisional patent application filed on Feb. 27, 1998 (Serial No. 60/077, 813).

BACKGROUND OF THE INVENTION

1. Field of the Invention

This invention relates to a system for reproducing an image on a large surface, the image being downloaded into a computer program which automatically operates image producing equipment assembled adjacent to the large surface to reproduce the image thereon.

2. Description of the Related Art

Outdoor advertising is a large and growing industry. Even though many municipalities have tried to regulate the outdoor advertising industry, it is increasing today because more people are "on-the-go".

A billboard is a "generic" term for a large, free-standing or building-supported structure upon which advertising is displayed. The advertising displayed on a billboard is usually printed on multiple poster panels or bulletins manufactured and installed by the outdoor advertising company. The process of printing, manufacturing, and installing these panels or bulletins is very time extensive. Also, the process of installing printed panels and bulletins on such structures is inherently unsafe to workers.

In some instances, it is desirable to reproduce an image, text or graphic on the billboard or large surface of a building. Heretofore, reproducing an exact or enlarged copy of the image, text or graphic has been very time consuming and dependent on the artistic talent of the artist.

What is needed is an alternative system of reproducing an exact or enlarged copy of an image, text or graphic on any large surface, such as a wall of a building or billboard. Such a system should enable the image to be more quickly and more economically reproduced than current methods. Also, such a system should be adaptable so that any image, text or graphic may be reproduced in any size, oriented in any direction, on smooth or textured surfaces, or selectively modified to accommodate windows, doors and other structures on the surface.

SUMMARY OF THE INVENTION

It is an object of the present invention to provide a system for reproducing any desired image, text or graphic on a large surface, such as the wall of a building or billboard.

It is another object of the present invention to provide such a system that can reproduce an exact image, text or graphic in any direction, size, or textured surface.

It is a further object of the present invention to provide such a system that is more economical and safer to use than current methods used in the outdoor sign industry.

These and other objects are met by a system for reproducing any desired image, text or graphic on a large surface, such as the wall of a building or billboard. The system includes a computer, translator program, a controller card and image reproduction machinery. The computer, which is designed to generate or receive an image file, is programmed with the translator program which converts the image file into instructional machine codes. The controller which is connected to the computer receives the instructional machine codes to control a plurality of drivers located on the image reproduction machinery. The drivers, in turn, control various motors located on various components found on the image reproduction machinery.

The image reproduction machinery comprises a guide rail, a carriage, means to move the carriage longitudinally over the guide rail, a medium head assembly and means to deliver a medium used to create the image, text or graphic from the medium head assembly to the desired surface. During assembly, the guide rail is longitudinally aligned immediately adjacent to the surface to be painted. A positioning means is used to selectively move the guide rail in one of two directions perpendicular to its longitudinal axis. The guide rail can be straight or curved to accompany flat or curved surfaces, respectively. During assembly, the carriage is placed on the guide rail and the means to move the carriage longitudinally over the guide rail is disposed between the guide rail and the carriage. The medium head assembly is attached to the carriage and contains means to deliver the medium to the surface. In the preferred embodiment, the means to deliver the medium comprises a plurality of independently controlled airbrushes which spray this medium onto the surface. The valves of each airbrush are independently controlled by a motor which, in turn, is connected to a driver that amplifies signals from the controller card.

The movement of the guide rail and carriage, and the operation of the valves on the airbrushes are finely coordinated by the translator program so that an image downloaded into the computer is gradually created on the surface one pixel at a time, parallel to the longitudinal axis of the guide rail. The distance of the medium head assembly from the surface and the initial orientation of the individual airbrushes may be adjusted so that the size of the individual pixels in the image can be varied to adjust the resolution of the image.

An important feature of the invention is that any image or picture can be downloaded into the computer and then exactly reproduced on a multitude of different surfaces. The orientation of the image may be altered and specific areas in an image can also be deleted or modified to accommodate windows, doorways or other structures on the surface.

DESCRIPTION OF THE PREFERRED EMBODIMENT(S)

Figure 1:
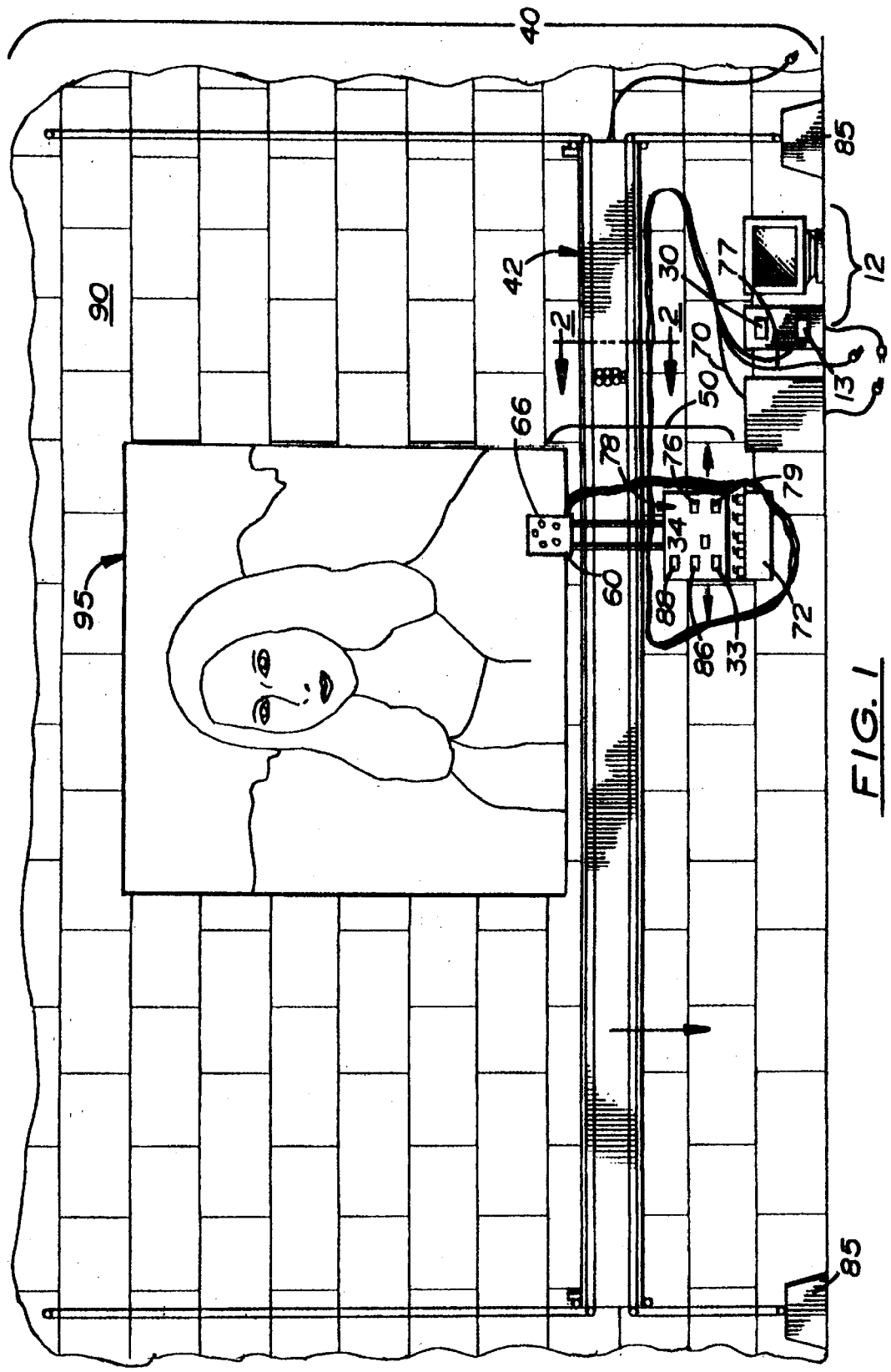
FIG. 1 is a front elevational view of the invention disclosed herein used to produce an image on a large surface.

Shown in the accompanying FIG. 1, there is shown a system, generally referred to as 10, for reproducing any desired image, text or graphic on a large surface 90, such as the wall of a building or a billboard. The system 10 includes a computer 12, a translator program 20, a controller card 30, and image reproduction machinery 40. During assembly, the translator program 20 is loaded into the computer's memory. The controller card 30 is electrically connected to the computer 12. The image reproduction machinery 40 is controlled by the controller card 30. The translator program 20 converts a digitalized image file loaded into the computer's memory into machine codes capable of being processed by the controller card 30. When the machine codes are delivered to the controller card 30, they are further processed into signals which control one of a plurality of drivers 32. The drivers 32 amplify the signals from the controller card 30 to control various motors used in the image reproduction machinery 40. The movements of the image reproduction machinery 40 are finely coordinated by the translator program 20 so that an image downloaded into the computer 12 is gradually created on the surface one pixel at a time.

The image reproduction machinery 40 comprises an elongated guide rail 42, a carriage 50, a medium head assembly 60, and means to control their movement. In the embodiment shown in the Figs., the guide rail 42 is suspended in horizontal orientation immediately adjacent to the surface 90 to be painted. In the preferred embodiment, the guide rail 42 is an I-beam made of rigid, lightweight material, such as aluminum, measuring twenty to fifty feet in length. The guide rail 42 may be straight or curved so that it is positioned parallel and adjacent to the surface 90 along its entire length. Typically, the length of the guide rail 42 slightly exceeds the overall width of the final image.

Figure 5:
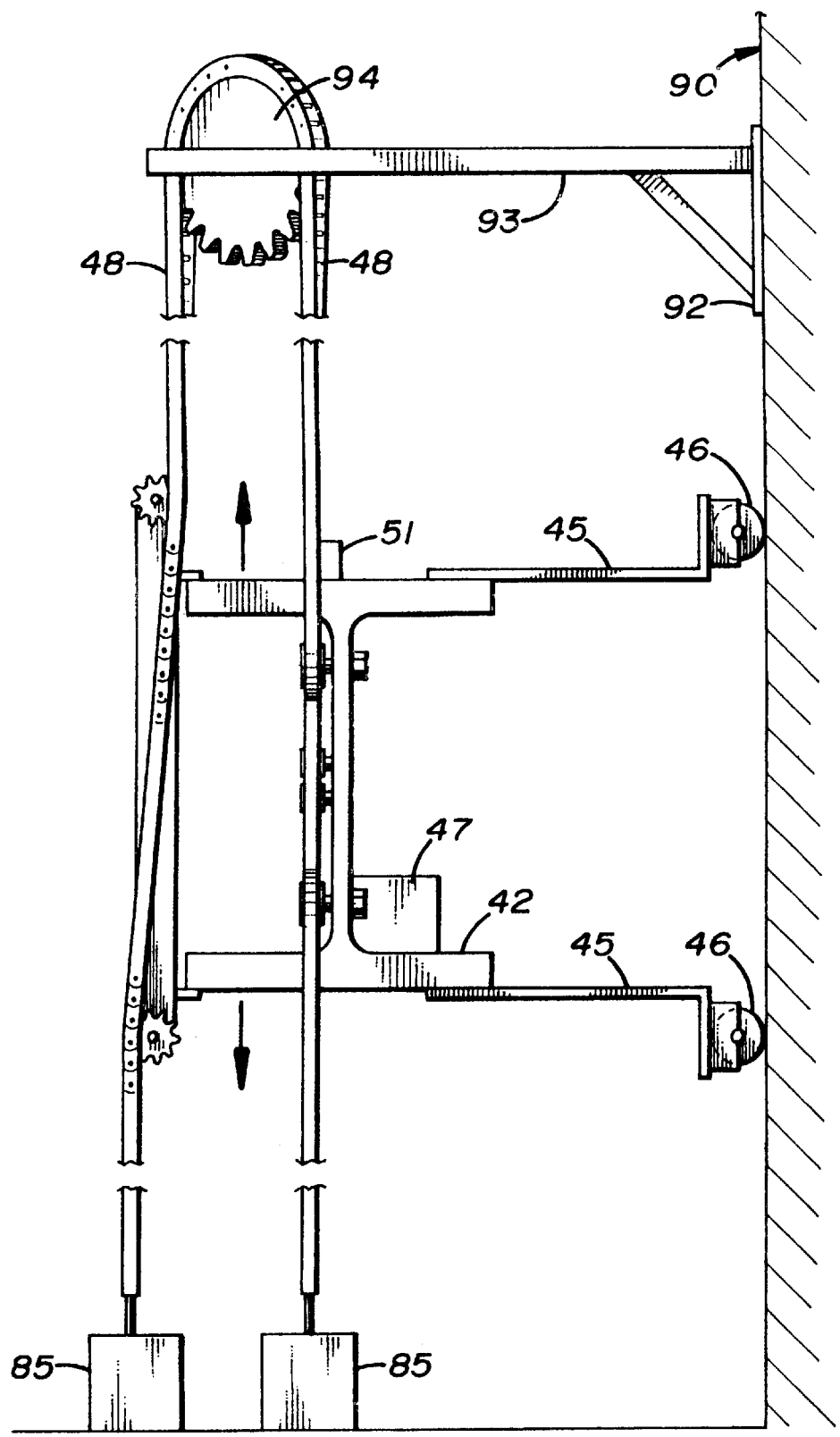
FIG. 5 is a sectional, side elevational view of the guide rail suspended next to the vertical surface.

As shown in FIG. 5, an inward projecting extension arm 45 is attached to each end of the guide rail 42. The extension arms 45 are aligned perpendicular to the longitudinal axis of the guide rail 42 and act to hold the guide rail 42 a constant, predetermined distance from the surface 90. Attached to the distal end of each extension arm 45 is a roller 46 which presses against the surface 90 and allow the guide rail 42 to move vertically up and down over the surface 90.

Figures 3, 4:
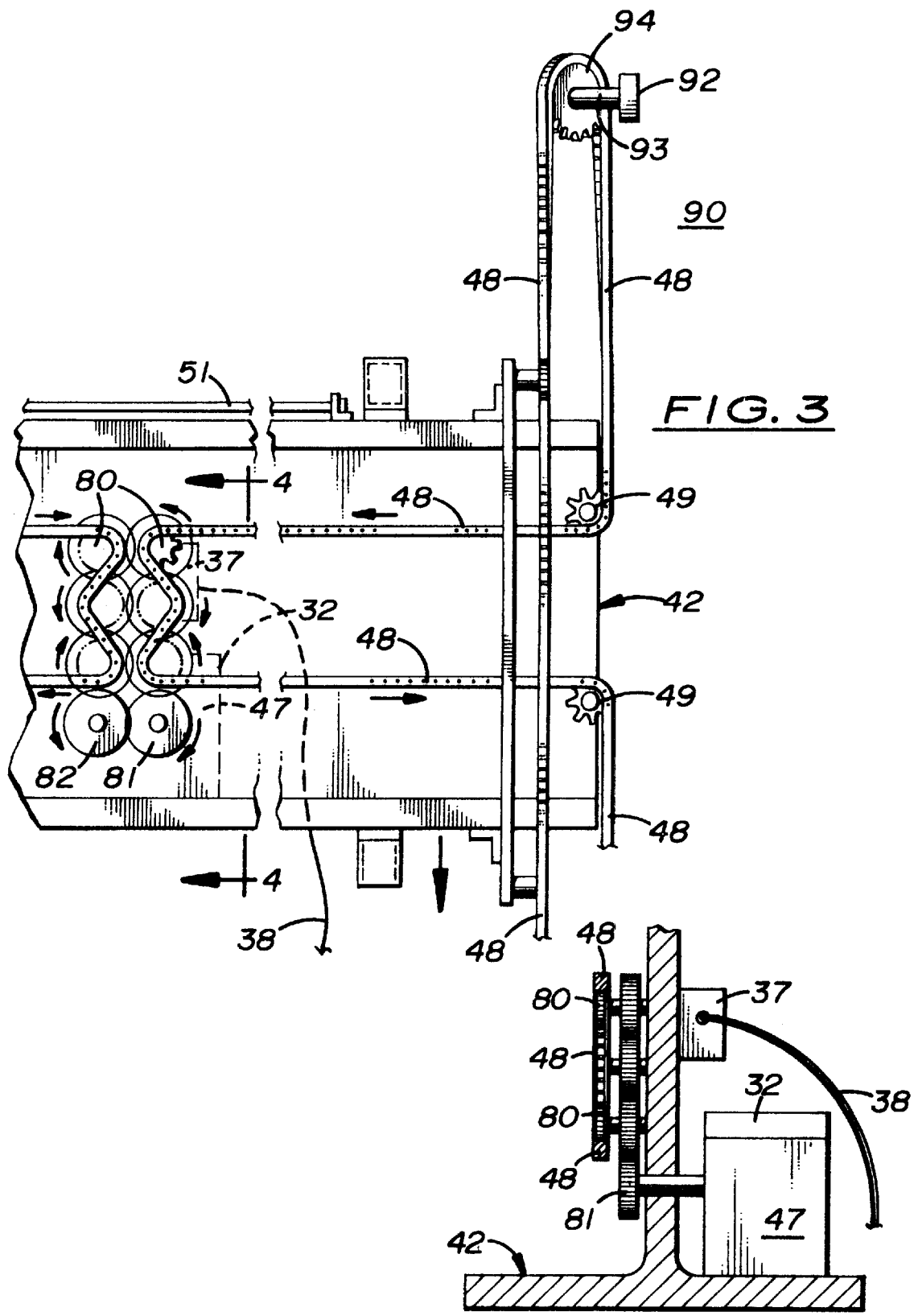
FIG. 3 is a front elevational view of one end of the guide rail.
FIG. 4 is a sectional side elevational view of the guide rail taken along line 4—4 in FIG. 3.

As shown in FIGS. 4 and 5, an anchor plate 92 is attached to the surface 90 above each end of the guide rail 42. Attached to the anchor plate 92 is support arm 93 which extends outward and perpendicular to the surface 90. A sprocket 94 is attached to the distal end of each support arm 93. During assembly, two anchors 85, shown in FIG. 1 are aligned over the anchor plate 92 and below the guide rail 42 near the lower edge of the surface 90. A chain 48 is vertically aligned and held in a fixed, suspended position between the sprocket 94 and the anchors 85 located below each end of the guide rail 42.

During operation, each end of the guide rail 42 ascends and descends the chain 48. Located near each end of the guide rail 42 is a pair of sprockets 49. As shown in FIG. 3, the middle section of each chain 48 extends inward along the longitudinal axis of the guide rail 42 where it engages a group of gear sprockets 80 located near the mid-point of the guide rail 42. In the preferred embodiment, there are six interconnected gear sprockets 80. Located below the gear sprockets 80 is a drive gear 81 connected to a follower gear 82. The drive gear 81 is coupled to a stepper motor 47 connected to a driver 32, both located on the opposite side of the guide rail 42. During operation, the controller card 30 sends signals to a driver 32 which controls a two-directional stepper motor 47. A transformer 37, electrically connected to the stepper motor 47, is attached to the guide rail 42. A power cord 38 delivers electricity to the transformer 37. When the drive gear 81 turns, the adjacent follower gear 82 and all of the adjacent gear sprockets 80 turn. When the drive gear 81 is rotated, the sprockets 49 located at each end of the guide rail 42 ascend and descend along the chain 48 according to the direction of rotation of the stepper motor 47. During operation, each end of the guide rail 42 moves along the chains 48 at the same rate thereby maintaining the guide rail 42 at a horizontal orientation at all times.

The carriage 50 is designed to move longitudinally back and forth over the top surface of the guide rail 42 during operation. In the preferred embodiment, the carriage 50 includes an upper medium head assembly 60 integrally attached to a centrally located control box 78, and a lower, medium container holding tray 72.

Figure 2:
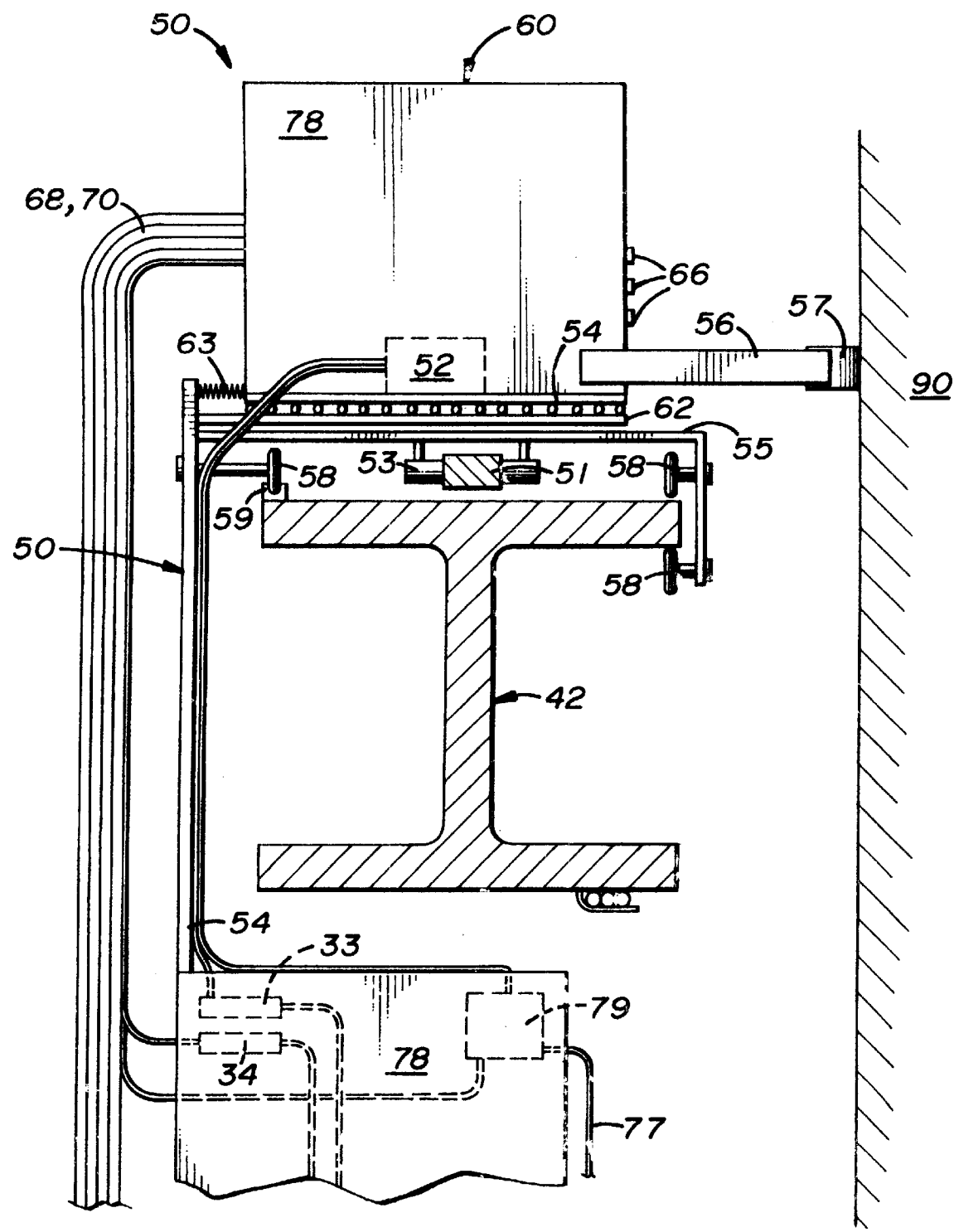
FIG. 2 is a sectional, side elevational view of the invention taken along line 2—2 in FIG. 1.

Disposed between the carriage 50 and the guide rail 42 is means to move the carriage 50 longitudinally over the guide rail 42 as shown in FIG. 2. In the preferred embodiment, the means includes a longitudinally aligned chain 51 and a variable direction stepper motor 52 attached to the carriage 50. The chain 51 is disposed over the top flange of the guide rail 42 and attached at its opposite ends to the opposite ends of the guide rail 42. During assembly, a sprocket 53 is attached to the drive shaft on the stepper motor 52 engages the chain 51. When the stepper motor 52 is activated during operation, the carriage 50 is able to move longitudinally over the chain 51 and the guide rail 42.

An extension arm 56 extends inward from the medium head assembly 60. A roller 57 is attached to the distal end of the extension arm 56 which enables the medium head assembly 60 to move transversely across the surface 90 at a predetermined distance therefrom as the guide rail 42 and carriage 50 are moved. A sliding plate 62 is disposed between the medium head assembly 60 and the carriage 50 which allows the medium head assembly 60 to move inward and outward from the surface 90 during operation. A spring 63 is attached between the medium head assembly 60 and the carriage 50 to provide a constant inward directed tension force against the medium head assembly 60 thereby constantly forcing it toward the surface 90 during operation.

During assembly, the top flange member 55 of the carriage 50 is disposed across the upper flange surface of the guide rail 42. The extended portion of the flange member 55 is bent downward to extend over the upper flange surface of the guide rail 42. Attached to the inside surface of the extended portion of the flange member 55 are a pair of wheels 58 which travel along the upper and lower surfaces of the upper flange. During operation, the wheels 58 act to support and allow the carriage 50 to move on the guide rail 42. Located on the inside surface of the carriage 50 is a third wheel 58' which travels inside a track 59 aligned longitudinally over the entire length of the top, outside edge of the upper flange surface of the guide rail 42. The track 59 keeps the carriage 50 properly aligned on the guide rail 42 during operation.

Figure 6:
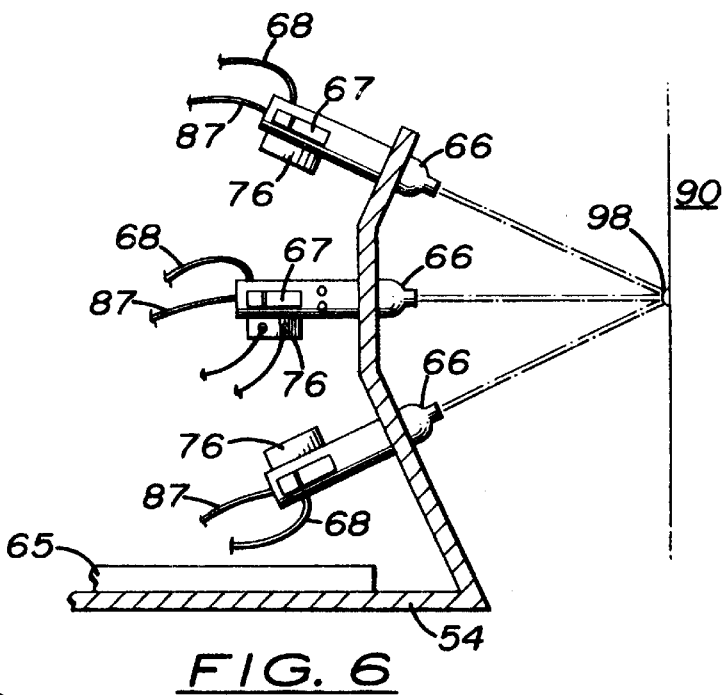
FIG. 6 is a side sectional view of the medium head assembly.
Figure 8:
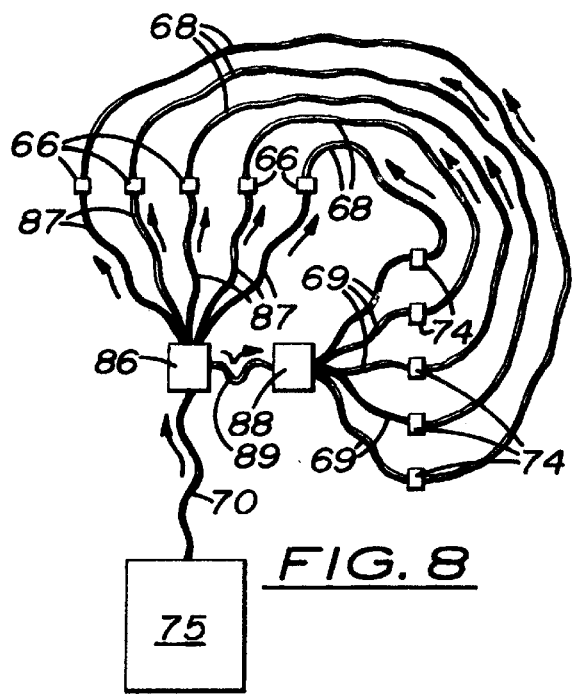
FIG. 8 is a diagram illustrating the connections between the computer, air regulators, medium containers, and the airbrushes.
Figure 7:
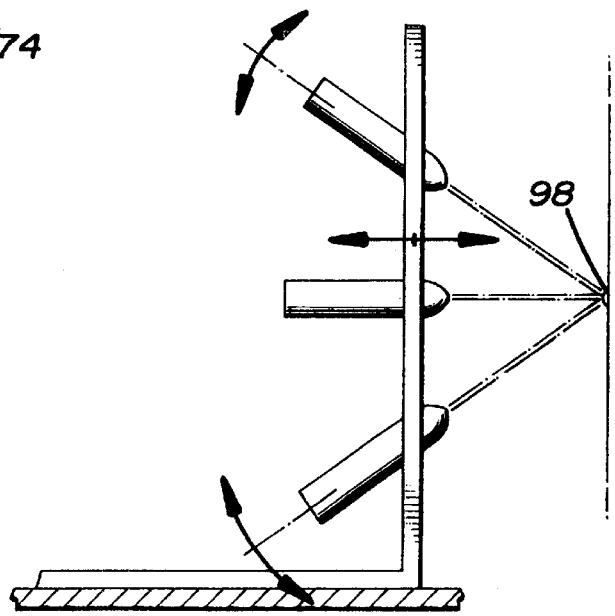
FIG. 7 is a side elevational view of the medium head assembly showing the airbrushes being re-positioned in the medium head assembly when the distance between the medium head assembly and the surface is reduced.

The medium head assembly 60 includes a plurality of airbrushes 66 attached to an alignment plate 64. As shown in FIG. 6, the alignment plate 64 is attached to a support plate 65 that attaches to carriage framework 54. In the preferred embodiment, there are five airbrushes 66 radially aligned on the alignment plate 64 so that the spray from each airbrush 66 converge and intersect at a focal point 98 approximately equal to the distance of the guide rail 42 from the surface 90. As shown in FIG. 8, each airbrush 66 is connected to a medium supply line 68 and an air supply line 87. By adjusting the orientation of each airbrush 60 on the alignment plate 64, the focal length of the airbrushes 66 may be adjusted.

As shown in FIG. 1, located below the medium head assembly 60 is the medium container holding tray 72, designed to hold a plurality of pressurized medium containers 74, each connected to one airbrush 66. By locating the medium containers 74 in the medium container holding tray 72 and attaching it to the carriage 50, the distance between the containers in the holding tray 72 and the airbrushes 66 in the medium head assembly 60 is constant. As illustrated in FIGS. 1 and 8, a main air pressure line 70 is connected at one end to an air compressor 75, shown located on the ground. The opposite end of the main air pressure line 70 is connected to a first air regulator 86. Attached to the first air regulator 86 are the individual air supply lines 87 that deliver air to each airbrush 66. A second connection line 89 connects the first air regulator 86 to a second air regulator 88 which delivers pressured air to each medium container 74 via the connect lines 69. Both the first and second air regulators 86, 88, respectively, are located in the control box 78 as shown in FIG. 1. Medium supply lines 68 then deliver medium to each airbrush 66. The medium used may be any type suitable for the image or surface.

As shown in FIG. 6, each airbrush 66 includes a valve 67 which is controlled by a variable direction, low voltage stepper motor 76. The stepper motor 76 opens and closes the valve 67, thereby controlling the amount of medium delivered to the surface 90 by the airbrush 66. When the valve 67 is closed, the flow of medium is discontinued while air is still delivered from the airbrush 66 and to the surface 90. The air from the airbrushes 66 counter balance each other to maintain the focal point 98 regardless of which valve 67 is on or off. Each stepper motor 76 is connected to a driver 34 which is connected to the controller card 30.

As shown in FIG. 1, the controller box 78 contains a low voltage transformer 79 and the drivers 33, 34 that control the stepper motors 52, 76, respectively, used in the medium head assembly 60. The transformer 79 is electrically connected to the drivers 33, 34, respectively, to deliver low voltage thereto. A power cord 77 delivers electricity to the transformer 79.

The image, text or graphic produced by the system is in digital form consisting of lines of dots, also known as pixels, so that a multitude of dots creates lines, therefore creating the image. Each pixel has its percentage of color. For projected light, the percentages are in the form of red, blue and green (i.e. a television screen). For reflective light, such as with a printed page or painting, the percentage are in the form of cyan, magenta, yellow, and black, with white being the unused section.

Figure 9:
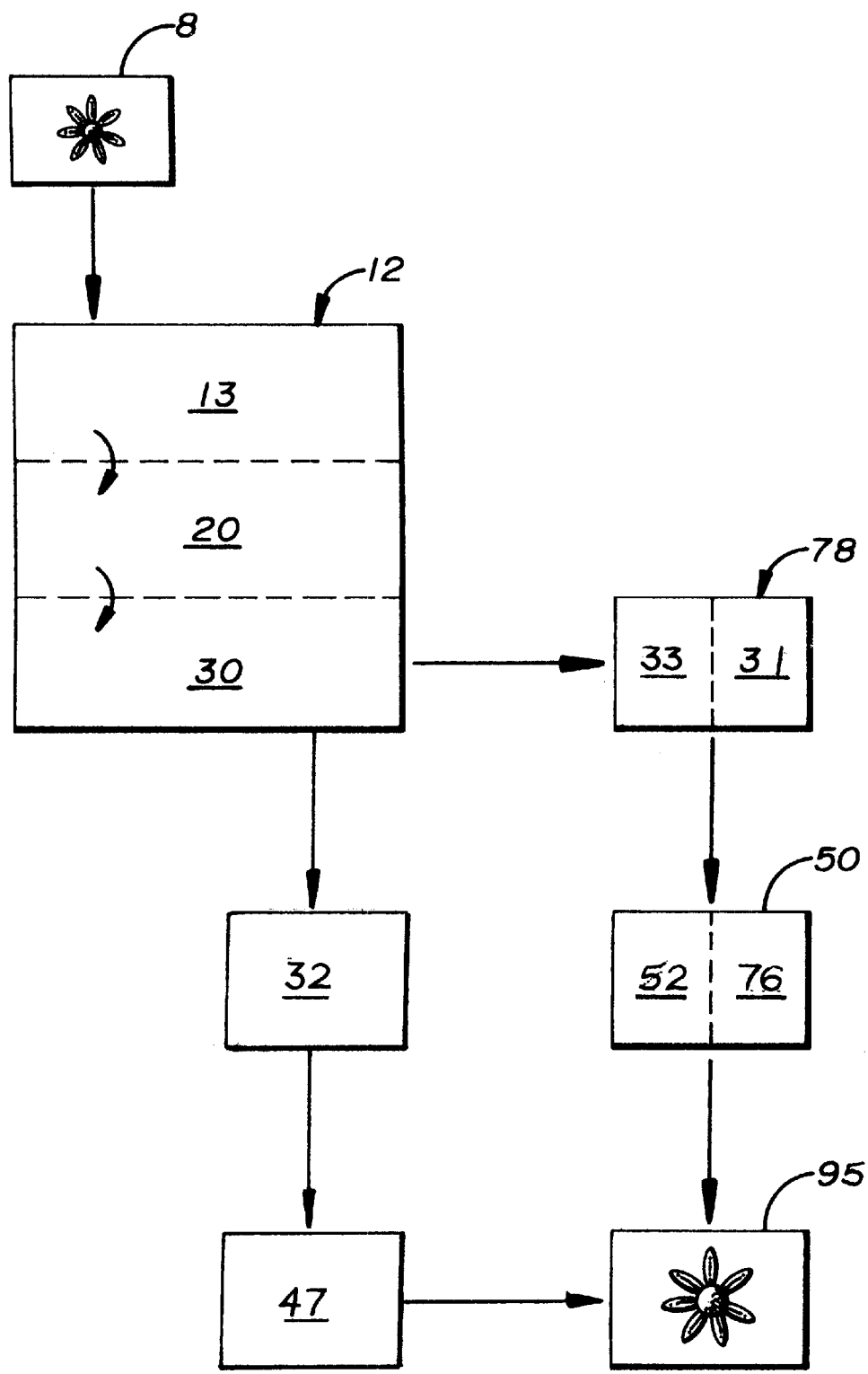
FIG. 9 is a flow chart diagram of the overall system.

An overall illustration of the system 10 is shown in FIG. 9. An image 8 is first selected and loaded in the computer's 12 memory 13. The translator program 20, loaded in the memory 13, then converts the image file into instructional machine codes capable of being used by the controller card 30 connected to the computer 12.

During operation, the translator program 20 determines the percentages of each color used in the original image (i.e. twenty percent cyan, fifty percent magenta, forty percent yellow, and twelve percent black) and then creates image command codes used by the controller card 30. The translator program 20 also allows the operator to vary the overall size of the image to be created on the surface 90. The controller card 30 controls the drivers 32, 33 that, in turn, control the stepper motors 47 and 52 respectively that moves the guide rail 42 vertically over the surface 90 and moves the carriage 50 along the guide rail 42 respectively. The controller card 30 also controls the driver 34 which, in turn, controls the stepper motor 76 that controls the airbrushes. After the translator program 20 creates the command codes they are stored in a file which can then be downloaded at any time to the controller card 30.

The controller card 30 also controls the stepper motor 52 that moves the carriage 50 along the guide rail 42. The guide rail 42, carriage 50, and airbrushes 66 move so that the image 95 is gradually created on the surface 90 one pixel and one line at a time, parallel to the longitudinal axis of the guide rail 42. By adjusting the initial orientation of the individual airbrushes 66, the size of the pixels in the image 95 can be set between one-eighth to one inch in diameter to adjust the resolution.

In compliance with the statute, the invention, described herein, has been described in language more or less specific as to structural features. It should be understood, however, the invention is not limited to the specific features shown, since the means and construction shown comprised only the preferred embodiments for putting the invention into effect. The invention is, therefore, claimed in any of its forms or modifications within the legitimate and valid scope of the amended claims, appropriately interpreted in accordance with the doctrine of equivalents.

I claim:
1. An image reproducing system, comprising:
   a. a guide rail having a longitudinal axis;
   b. means to dispose said guide rail adjacent to a surface to be treated;
   c. a carriage. with a plurality of wheels that enable said carriage to move longitudinally along said guide rail;
   d. at least one medium delivering means disposed on said carriage;
   e. means to move said guide rail in a direction perpendicular to said longitudinal axis of said guide rail;
   f. means to move said carriage longitudinally over said guide rail;
   g. means to control said medium delivering means; and
   h. coordinating means to control said means to move said guide rail, said means to move said carriage longitudinally over said guide rail, and said medium delivering means to produce a desired image on a large surface.

2. An image reproducing system, as recited in claim 1, wherein said means to dispose said guide rail adjacent to a surface includes at least one chain disposed adjacent to the surface to be treated and suspended from said guide rail adjacent to the surface.

3. An image reproducing system as recited in claim 1, further including a fixed chain disposed longitudinally over said guide rail and a motor attached to said carriage, said guide rail engaging said chain to selectively move said carriage over said guide rail.

4. An image reproducing system as recited in claim 1, wherein said medium delivery means is a plurality of airbrushes coupled to a medium container and an air supply, said airbrushes being adjustably attached to said carriage enabling the distance between each said airbrush and a surface to be treated to be adjusted.

5. An image reproducing system as recited in claim 1, wherein said coordinating means is a computer which receives an image file of a desired image and controlling the means to move said guide rail said means to move said carriage longitudinally over said guide rail, and said medium delivery means to produce a desired image on a surface.

6. An image reproducing system as recited in claim 5, further including a translator program loaded into said computer to convert the image into machine codes that are used by said means to move said guide rail, said means to move said carriage and said medium delivery means.

7. An image reproduction system comprising:
   a. a computer having sufficient memory to process an image data file of a desired image to be reproduced on a surface;
   b. a translator program loaded into the memory of said computer used to process an image data file into machine codes, said translator program controlling the image production assembly to produce an image by creating a plurality of pixels formed in a line parallel to the longitudinal axis of said guide rail and moving the guide rail successively over the surface to be treated;
   c. a controller card connected to said computer used to process the machine codes;
   d. image reproduction machinery assembled adjacent to a desired surface connected to said controller card that uses said machine codes to reproduce an image on a desired surface, said image reproduction machinery including a guide rail, a carriage that selectively moves longitudinally along said guide rail, said carriage including at least one air brush that can be adjusted on said carriage enabling the distance between said airbrush and a surface to be treated to be adjusted; and,
   e. means to connect said image reproduction machinery to said controller card.

8. An image reproduction system as recited in claim 7, wherein said means to move said carriage on said guide rail is a fixed chain disposed on said guide rail, and a motor attached to said carriage that moves said carriage along said chain.

9. An image reproduction system as recited in claim 7, wherein said means to move said guide rail is at least one chain perpendicularly aligned to said guide rail said chain being engaged by said guide rail thereby enabling said guide rail to move longitudinally over said chain.

10. An image reproduction system as recited in claim 9, further including at least one motor and at least one gear engaged to said chain, so that when said motor is activated, said guide rail moves longitudinally along said chain.

11. An image reproduction system as recited in claims 7, further including a motor and gear engaged with said chain disposed over said guide rail, whereby when said motor is activated, said carriage moves longitudinally over said chain.

12. An image reproduction system as recited in claim 7, wherein said carriage includes a container holding means which holds a plurality of medium containers, each connected to an airbrush.

* * * * *